United States Patent [19]

Allison

[11] Patent Number: 4,761,868

[45] Date of Patent: Aug. 9, 1988

[54] TOOL FOR BEARING REMOVAL

[76] Inventor: Larry S. Allison, 2353 Oak St., Muskegon, Mich. 49442

[21] Appl. No.: 60,231

[22] Filed: Jun. 10, 1987

[51] Int. Cl.⁴ .................... B23P 19/04

[52] U.S. Cl. .................... 29/256

[58] Field of Search .................... 29/256–260, 29/263, 266

[56] References Cited

U.S. PATENT DOCUMENTS

| | | | |
|---|---|---|---|
| D. 286,499 | 11/1986 | Moreno | 29/257 |
| 668,831 | 2/1901 | Docharty et al. | 29/259 |
| 1,280,233 | 10/1918 | Jones | 29/259 |
| 1,346,857 | 7/1920 | Srader | 29/263 |
| 1,465,124 | 8/1923 | Gardner | 29/263 |
| 1,498,638 | 6/1924 | Periolat | 29/256 |
| 1,554,468 | 9/1925 | Tague | 29/256 |
| 3,007,241 | 11/1961 | Gonzalez | 29/266 |

*Primary Examiner*—Robert C. Watson
*Attorney, Agent, or Firm*—Price, Heneveld, Cooper, DeWitt & Litton

[57] ABSTRACT

A tool is provided for sequentially axially separating a housing and the shaft and bearing components which were originally press fitted into it. The tool is provided with means to detachably secure it to the housing to permit it to generate the pressures necessary to either push the components out of the housing or to lift the housing off the components one by one.

3 Claims, 2 Drawing Sheets

TOOL FOR BEARING REMOVAL

FIELD OF THE INVENTION

The invention relates to tools used in the repair and replacement of axles and bearings, particularly on the front wheel drive assemblies of automobiles.

BACKGROUND OF THE INVENTION

The drive assembly of front wheel drive vehicles often requires replacement of some of its components due to wear. These drive assemblies are subjected to severe stresses both torsional and angular due to both the necessity for steering the vehicle and the vertical movement of the drive assembly as the vehicle traverses uneven surfaces. This results in wear requiring replacement of some of the components of the drive assembly. Particularly is this true of splined shaft connections where wear occurs on the splines and the spline channels resulting in play between the spline teeth and spline channels. To replace the worn parts it is first necessary to remove them. These parts are normally press fitted into their housing, the fit being with sufficient force to positively lock the parts together frictionally. The frictional interfit between the parts will normally become more binding as a result of a long interval of use.

In the facilities where such repairs are made, even those which are most extensively tooled for making these repairs there are few tools specifically designed for the removal of these worn parts. There are even fewer tools so designed that they can be successfully used to remove the worn parts and also remove salvageable parts without damage to such parts. Consequently, it is common practice to remove these parts by impact tools such as a chisel or bar to which the operator applies a hammer or other impact tool. The result of this is that all parts so removed are scrap. Also, the time necessary to accomplish the job is excessive.

BRIEF DESCRIPTION OF THE INVENTION

The invention provides a saddle so designed that it can be detachably secured to the housing from which the worn parts are to be removed and then a threaded shaft, centered over the part to be removed, is seated on a drive block selected to be so shaped as to seat on the end of the part to be removed. The shaft has a fine thread to generate the necessary thrust. Where the parts to be removed are telescoped, one within the other, the tool is provided with a selection of the drive blocks of various sizes, each designed to seat against the end of only one of the parts so that it can be selectively removed without the tool applying any axially directed pressure to the next part surrounding it, except that which is transmitted by virtue of the interfit of the parts. The tool is made adaptable to various combinations of bearing assemblies by the interchangeability of the drive blocks. By so removing the parts using steadily applied axial pressure, they are not damaged, thus, preserving those which can be salvaged either for immediate reuse or after reconditioning. Further, the time required to mount the tool and complete the removal of the parts is only a fraction of that required by methods and equipment currently in use for such purposes.

DESCRIPTION OF THE PREFERRED EMBODIMENT

Figure 1:
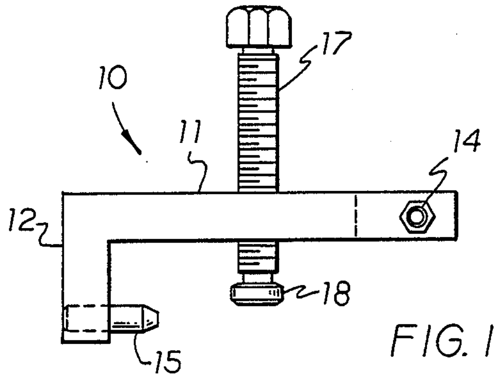
FIG. 1 is a side elevation view of the tool of this invention.
Figure 2:
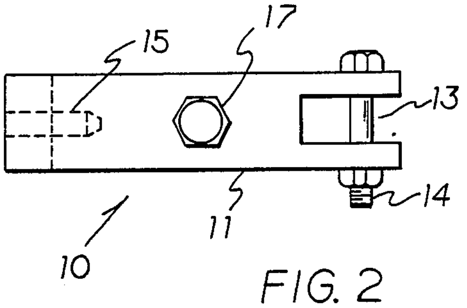
FIG. 2 is a top plan view of the tool.
Figure 4:
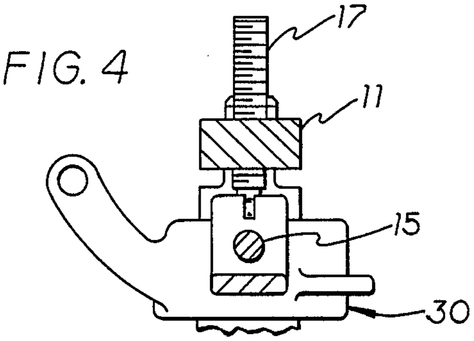
FIG. 4 is a sectional elevation view taken along the plane IV—IV of FIG. 3.

FIG. 1 illustrates a tool 10 having a transverse or top bar 11 and a vertical leg 12. The bar and leg are of heavy steel stock which can withstand severe bending pressures without any appreciable flexing. The free end of the bar 11 is bifurcated, providing a slot 13 of a width to receive the arm 31 of the housing 30 (FIG. 2). With the end of the bar 11 seated about the arm 31, a bolt 14 is used to secure the end of the bar to the housing.

Figure 6:
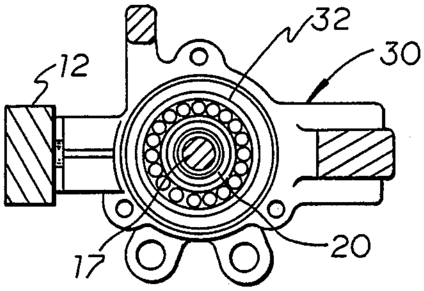
FIG. 6 is a sectional view taken along the same plane as FIG. 5 with the tool mounted on the assembly.
Figure 5:
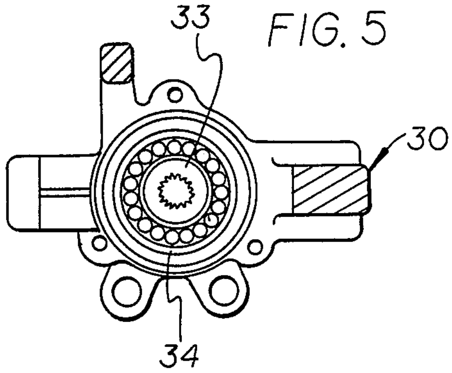
FIG. 5 is a sectional view taken along the plane V—V of FIG. 3 with tool removed.
Figure 6A:
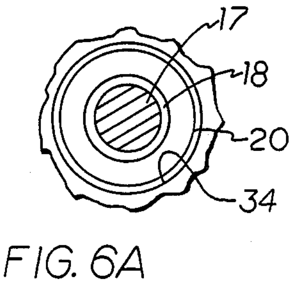
FIG. 6A is a partially schematic view illustrating the relationship between the bearing and the inner or smaller of the drive blocks.

The leg 12, adjacent its lower end, has a pin 15 extending in the same direction as and parallel to the bar 11. The pin 15 is of a diameter and so positioned that it seats in an existing opening 19 in the side of the housing 30, which opening has been provided for an entirely different purpose. At a point centered over the central axis of the axle opening 32 in the housing 30, the bar 11 is provided with a threaded opening for the pressure screw 17. The screw has a diameter of 0.875 inch or greater so that it will not flex under high compression loads such as 2000 lbs. or more. The screw also has a national fine thread to reduce the amount of torque required to turn it against the resistance of the part being displaced. The lower end of the screw is provided with a cap 18 which is preferably so mounted to the end of the screw that it has a small degree of rocking adjustment with respect to the axis of the screw. The end of the cap is flat to seat against a drive block 20 (FIG. 6). The drive block is of a size and shape to seat against a major portion of the available surface of the part to be displaced. Thus, as illustrated in FIG. 6A, the block is slightly smaller than the inside diameter of the inner race of the bearing 34. This is to assure the application of pressure only to the shaft 33 being removed.

The adjustability of the cap with respect to the screw's axis assures the application of uniform pressure to the part throughout the area of contact between the block 20 and the part. This is important to prevent any tendency to twist the part and thus increase resistance to removal.

To remove a shaft from the bearing, the pressure is applied by turning the screw 17 by means of either a manual or a power socket wrench secured to its upper end. In this manner, sufficient pressure can be exerted against the shaft to progressively drive it out of the bearing 34 into which it had been initially press fitted. Thus, the shaft 33 normally can be removed without damage to the bearing 34.

Figure 3:
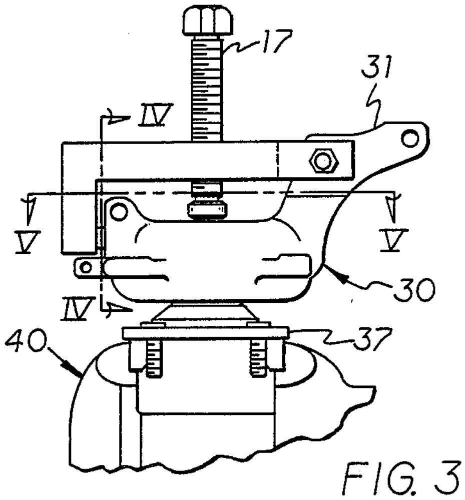
FIG. 3 is a view similar to FIG. 1 with the tool mounted on a drive assembly housing.
Figure 7:
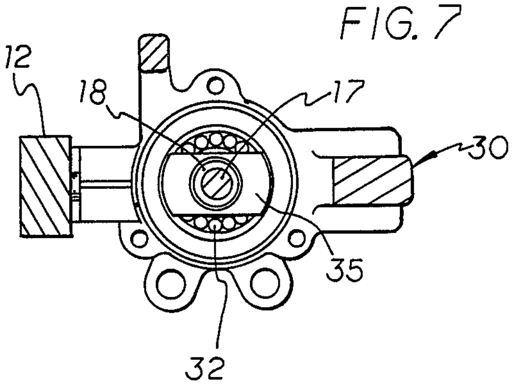
FIG. 7 is a sectional view taken along the same plane as FIG. 5 with a typical drive block used in this invention in place.

It will be observed in FIG. 3 that during this phase of the operation the housing 30 rests on a suitable support such as a vise 40 with the cap flange 37 on the end of the shaft in contact with the vise. As the pressure is applied, the screw lifts the housing and the tool upwardly off the shaft 33. When the housing with the bearing 34 has been separated from the shaft, the housing is moved away and the shaft and its cap flange 37 are removed and the screw backed off. The housing 30 is then replaced on the support, that is, the vise and the drive block 20 is replaced with a larger drive block 35 designed to engage the bearing (FIG. 7). The block 35 is illustrated as being a bar having rounded ends but it could also be a circular disc. If the opening through the shoulder which acts as a bearing stop is of a size permitting access to the outer bearing race, the block should be of a size to seat against the bearing's outer race. With the drive block seated against the bearing, the screw 17 is again turned to apply pressure driving the bearing out of the end of the housing 30.

Figure 8:
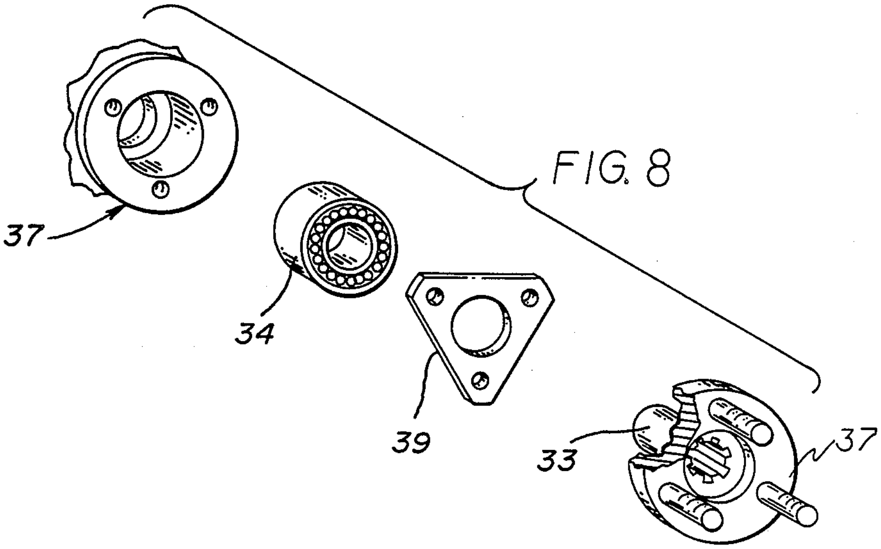
FIG. 8 is an exploded view of a typical assembly for which the tool can be used to disassemble.
Figure 4A:
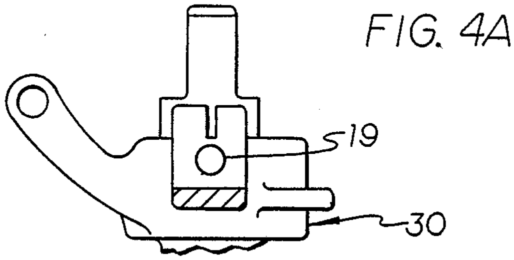
FIG. 4A is a view similar to FIG. 4 with the tool removed.

When the assembly is equipped with a retainer plate for the bearing such as the plate 39 (FIG. 8), after the shaft 33 has been removed, the housing is inverted and the retainer plate removed by unbolting it from the housing. This must be done before proceeding with the removal of the bearing. This has to be done after the shaft is removed when the shaft has a cap flange because the flange prevents access to the bolts securing the plate. Once the shaft has been removed, the screw is backed off and the drive block 20 replaced with a larger drive block 35 of a size to seat against the face of the bearing 34 and the procedure repeated to displace the bearing (FIG. 7). Should it so happen that the bearing also is seated in a sleeve, the removal of which is desired, by means of a third drive block of appropriate size, the sleeve also can be removed separately by repeating the steps previously described for removing the shaft 33 and bearing 34.

The ability to remove the shaft and bearing separately is quite advantageous under normal circumstances. Using the equipment heretofore available, either the bearing and shaft were removed as an assembled unit or were too badly damaged in the removal process for either to be salvaged. If they are removed as an assembly, no tools are available to the normal repair facility capable of separating them. Thus, both become scrap with no possibility of salvaging either one. However, when they are removed separately, the possibility of salvaging the bearing is quite likely since the initial useful life of the bearing is substantially greater than that of the shaft. Further, in many cases, the conventional method and equipment used for removing the shaft often requires a half hour on the part of an experienced mechanic while, using this invention, the removal of both, including tool set up time normally consumes a quarter to a third of that time. The simplicity of the tool makes it easy to use and requires little or no instruction, particularly for a skilled mechanic.

The invention has been described as applied to an assembly of the type which is mounted in a steel housing. However, it would be even more advantageous when applied to such bearings mounted in a housing of a non-ferrous material such as an aluminum casting. The use of impact tools to remove bearings from aluminum housings is much more likely to damage the housing, thus, vastly increasing the cost of making the repair. The use of a screw developing steady pressure eliminates the danger of this type of damage. The use of this invention results in significant savings to the vehicle owner in both parts and labor. It also reduces the time the vehicle has to be out of service.

Having described a preferred embodiment of my invention, it will be recognized that various modifications of the invention can be made without departing from the principles thereof. Such modifications of the invention as to be considered as included in the hereinafter appended claims, unless the claims, by their language, expressly state otherwise.

I claim:

1. A tool for reconditioning bearing supported shaft assemblies for automobile drive trains, said assemblies having a drive shaft and support bearings press fitted together and the resulting combination press fitted into one end of a shaft opening in housing, said drive shaft being co-axially telescopically press fitted into said bearing, said drive shaft and said bearing being capable of axial movement out of said housing through one end of the shaft opening, said tool having a rigid bar, said bar having a threaded opening intermediate its ends and anchor means at each end of said bar for anchoring it to said housing and supporting said bar in spaced relationship to the face thereof opposite from said one end of said shaft opening with said threaded opening centered over said shaft opening; said anchor means including a leg depending from one end of said bar and a pin projecting from said leg parallel to said bar and adjacent the end of said leg spaced from said bar, said housing having a pin receiving opening in one side thereof for anchoring said one end of said bar to the housing; said housing having an arm integral therewith and extending outwardly therefrom, the end of said bar remote from said leg being detachably secured to said arm; a threaded drive rod mounted in said threaded opening, a cap and means at one end of said drive rod mounting said cap thereto for limited angular adjustment with respect to the axis of said drive rod; a first removable drive block adapted to seat against the face of said cap, said drive block being shaped and of a size to seat against the end face only of the inner one of said drive shaft and bearing whereby upon pressure being applied by said drive rod to the inner one only of said shaft and bearing will be axially displaced with respect to each other and from said housing; a second drive block, said second drive block being of a size and shape to seat against only the end face of the outer one of said drive shaft and bearing after the inner one thereof has been removed whereby application of pressure by said rod to the remaining one of said drive shaft and bearing will cause said tool to lift said housing axially off the shaft when the shaft is supported against axial movement relative to the housing.

2. A tool for reconditioning bearing supported shaft assemblies for automobile drive trains, said assemblies having a drive shaft and support bearing telescopically press fitted together and the resulting combination press fitted into one end of a shaft opening in a housing, said drive shaft and said bearing being capable of axial movement out of said housing through one end of the shaft opening, said tool including a rigid bar having a depending leg at one end, said bar having a threaded opening intermediate its ends and anchor means at each end of said bar for anchoring it to said housing and supporting said bar in spaced relationship to the face of the housing adjacent thereto with said threaded opening centered over said shaft opening; said anchor means including a pin projecting from said leg parallel to said bar adjacent the end of said leg, said housing having a pin receiving opening in one side thereof for seating said pin; said housing having a projection extending therefrom and the end of said bar remote from said leg being detachably secured to said projection; a threaded drive rod element mounted in said threaded opening, a first removable drive block adapted to be engaged by said drive rod element, said drive block being shaped and of a size to seat against the end face only of the inner one of said drive shaft and bearing whereby upon pressure being applied by said drive rod the inner one only of said shaft and bearing will be axially displaced with respect to each other and from said housing; a second drive block adapted to be engaged by said drive rod element, said second drive block being of a size and shape to seat against only the end face of the outer one of said drive shaft and bearing after the inner one thereof has been removed whereby upon application of pressure to the remaining one of said drive and bearing said housing will be lifted axially off the remaining one of said shaft and bearing when the shaft is supported against axial movement relative to the housing.

3. A tool for reconditioning bearing supported shaft assemblies for automobile drive trains, said assemblies having a drive shaft and support bearings telescopically press fitted together and the resulting combination press fitted into one end of a shaft opening in a housing, said drive shaft and said bearing being capable of axial movement out of said housing through one end of the shaft opening, said tool including a rigid bar having a depending leg at one end, said bar having a threaded opening intermediate its ends and anchor means at each end of said bar for anchoring it to said housing with said threaded opening centered over said shaft opening; said anchor means including a pin adjacent the end of said leg and projecting from said leg parallel to said bar, said housing having a pin receiving opening in one side thereof for seating said pin; said housing having a projection extending therefrom and the end of said bar remote from said leg being detachably secured to said projection; a threaded drive rod element mounted in said threaded opening, a first removable drive block adapted to be engaged by said drive rod element, said drive block being shaped and of a size to seat against the end face only of the inner one of said drive shaft and bearing whereby upon pressure being applied by said drive rod the inner one only of said shaft and bearing will be axially displaced with respect to each other and from said housing; a second drive block adapted to be engaged by said drive rod element, said second drive block being of a size and shape to seat against only the end face of the outer one of said drive shaft and bearing after the inner one thereof has been removed whereby upon application of pressure to the remaining one of said drive and bearing said housing and the remaining one thereof will be axially separated.

* * * * *